Jan. 28, 1958  D. O. BENSON ET AL  2,821,258
COMBINED ADJUSTING ARM AND CARRYING HANDLE
Filed Sept. 9, 1954
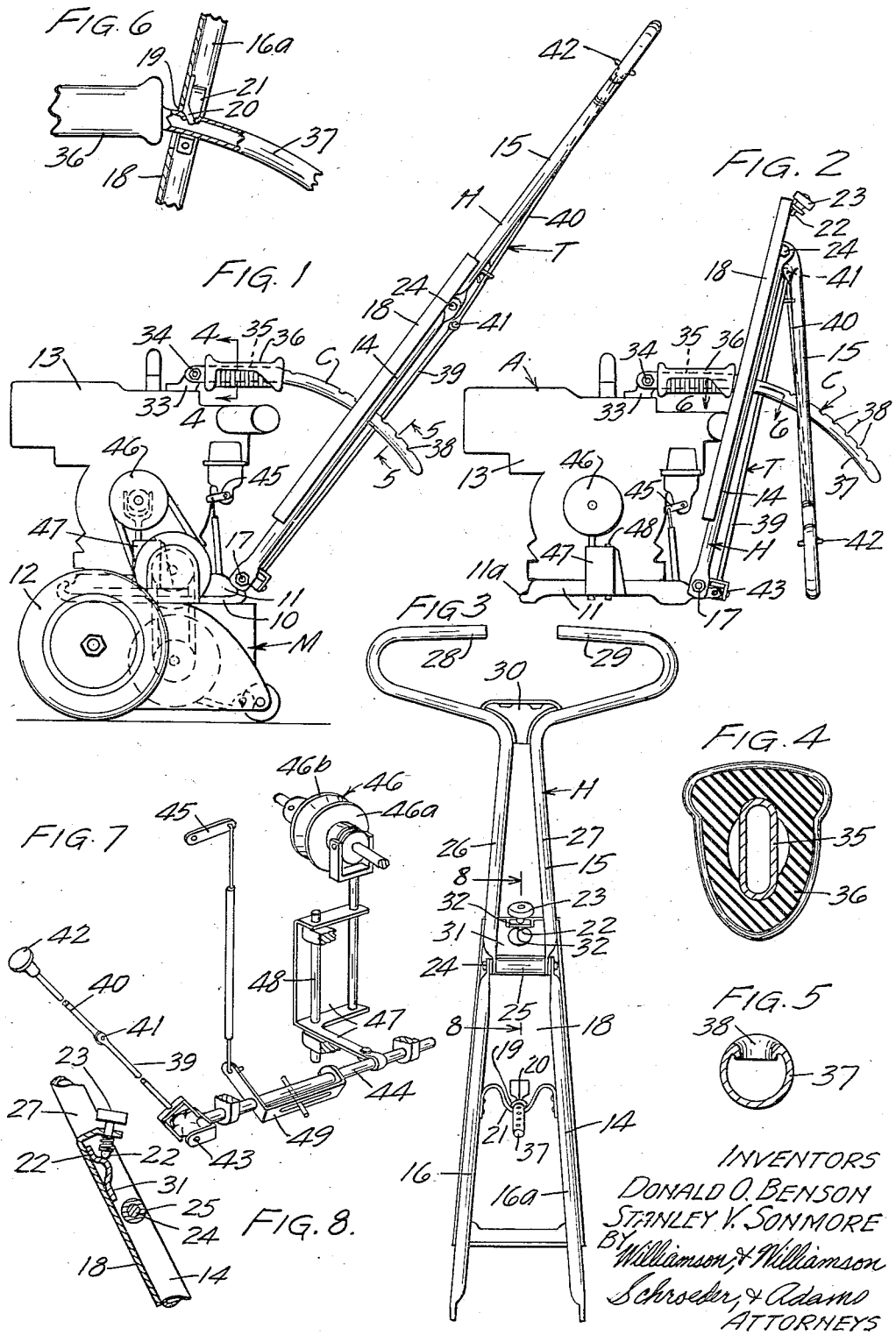
INVENTORS
DONALD O. BENSON
STANLEY V. SONMORE
BY Williamson & Williamson
Schroeder, & Adams
ATTORNEYS

United States Patent Office 2,821,258
Patented Jan. 28, 1958

2,821,258

COMBINED ADJUSTING ARM AND CARRYING HANDLE

Donald O. Benson and Stanley V. Sonmore, Minneapolis, Minn., assignors to Toro Manufacturing Corporation of Minnesota, Minneapolis, Minn., a corporation of Minnesota Application September 9, 1954, Serial No. 455,047

10 Claims. (Cl. 180—19)

This invention relates to hand guided ground traversing machines. More particularly, it relates to machines such as lawn mowers having guiding handles pivotally mounted thereon to permit adjustment of the angularity between the handle and the ground or machine and the means for adjusting the angulation of such handles. Even more particularly, it relates to a guiding and driving assembly adapted to be secured to and readily removed from a ground traversing machine adapted to be power driven.

In the manufacture of power-driven ground traversing machines such as lawn mowers it has been found desirable to provide a single unitary assembly for guiding and power driving such machines, this assembly to be adapted to be removably secured to a number of machines of different types and functions. In this manner a single engine which is a very substantial part of the cost of any such machines can suffice for a large number of different machines and thus a substantial savings may be effected. Use of such an assembly in this manner, however, necessitates the transfer of the assembly, which is quite heavy because of the weight of the engine, and so it is important to facilitate the manual handling in any way possible. It is also imperative that the assembly be capable of storage in small compass and hence the handle must swing to substantially vertical strong position. Our invention is directed toward overcoming these problems.

It is a general object of our invention to provide a novel and improved guiding and driving assembly for ground traversing machines which can be quickly and relatively easily transferred manually from one such machine to another.

A more specific object is to provide a novel and improved combined adjusting arm and carrying handle for such an assembly to facilitate the adjustment of the guiding handle of the assembly and at the same time provide a convenient and efficient carrying handle for the entire assembly.

Another object is to provide a novel and improved guiding and driving assembly for a combined carrying handle and adjusting arm for the guiding handle which is capable of being stored in relatively small compass.

Another object is to provide a novel guiding and driving assembly having a combined carrying handle and adjusting arm for the guiding handle of the assembly which is constructed to effectively balance the weight of the assembly in order to facilitate manual carrying of the same when the guiding handle is in stored position.

Another object is to provide a novel guiding and driving assembly for ground traversing machines having a combined carrying handle and adjusting arm for the guiding handle, the guiding handle being collapsible and swingable along the adjusting arm and into small compass.

Another object is to provide a novel guiding and driving assembly having a combined carrying handle and adjusting arm for the guiding handle structure, a portion of the combined carrying handle and adjusting arm remaining horizontal at all times to facilitate movement of the entire assembly regardless of the angulation of the guiding handle.

These and other objects and advantages of our invention will more fully appear from the following description made in connection with the accompanying drawings, wherein like reference characters refer to the same or similar parts throughout the several views and in which:

Fig. 1 is a side elevational view of a reel-type lawn mower with one embodiment of our invention being used thereon;

Fig. 2 is a side elevational view of the guiding and driving assembly removed from the lawn mower shown in Fig. 1 and with the guiding handle in folded storing position;

Fig. 3 is a rear elevational view of the guiding handle structure of the assembly with the combined handle and adjusting arm extending therethrough;

Fig. 4 is a vertical sectional view taken along line 4—4 of Fig. 1;

Fig. 5 is a sectional view taken along line 5—5 of Fig. 1;

Fig. 6 is a side elevational view taken along line 6—6 of Fig. 2 with parts thereof broken away; and Fig. 7 is a diagrammatic view showing the operative connections between the combined clutch and throttle control with the clutch and throttle.

Fig. 8 is a fragmentary sectional view taken along approximately line 8—8 of Fig. 3.

One embodiment of our invention may include as shown in Figs. 1-7 a lawn mower indicated generally as M having a mounting plate 10 extending across the upper surface thereof adapted to engage an adapter plate 11 so as to fixedly connect the two together in any conventional manner. As shown, the adapter plate has an upwardly and forwardly extending lip 11a which cooperates with an overhanging lip at the front of the mower M as best shown in Fig. 1 to secure the forward end of the adapter plate to the connecting plate 10. Suitable fastening means (not shown) is provided at the rear of the connecting plate to engage the rear of the adapter plate 11 and removably secure the same thereto. As shown, the mower M has ground wheels 12 which enable the mower M to traverse the ground. A gasoline motor or engine 13 is fixedly secured to the upper surface of the adapter plate 11 so that the motor may be moved from machine to machine for connection in power-driving relation therewith so long as each machine is provided with a connecting plate which will cooperate with the adapter plate 11 for securing the entire assembly shown in Fig. 2 and designated by the letter A.

The guiding and driving assembly A, as shown, is provided with guiding handle structure indicated generally by the letter H. This guiding handle structure has a lower part 14 and an upper part 15. The lower part 14 has laterally spaced side members 15 and 16 which are pivotally connected to opposite sides of the adapter plate by pivot bolts 17. These pivot bolts enable the guiding structure H to be swung around the axis of these bolts so as to extend at various angles to the adapter plate 11.

Reference to Fig. 3 will show that the side members 15 and 16 converge upwardly and are connected by a connecting panel or plate 18. This plate 18 has a centrally disposed opening 19 formed therethrough and a latching dog 20 is secured to the plate immediately above the opening and extending downwardly a short distance to a point behind the opening. An M-shaped spring 21 is secured by its end portions to the laterally spaced side members 15 and 16 as best shown in Fig. 3 and this spring, because of its shape and positioning, is constantly urged upwardly toward a position above the opening 19.

A vertically movable locking element 22 is mounted on the upper portions of the plate member 18 and extends downwardly a short distance therebehind. This locking element 22 is constantly urged downwardly into locking position by a spring member (shown in Fig. 8) and can be drawn upwardly by the user pulling upwardly on the knob 23.

The upper ends of the converging side members 14 and 16 are connected by a pivot bolt 24 which carries a spacer sleeve 25 extending between the lower ends of converging side members 26 and 27 of the upper part 15 of the guiding handle structure. These converging side members 26 and 27 diverge at their medial portions and then turn upwardly and then converge again to form grip members 28 and 29. They are connected by a connecting plate 30 at the area where they diverge and this connecting plate serves as a mounting for the combined throttle and clutch control element to be hereinafter described.

A metal plate 31 is welded to the lower end portions of the side members 26 and 27 and connects the two. This plate has a recess 32 formed therein which is positioned so that the locking element 22 will snap into position behind the plate 31 and lock the upper part 15 of the guiding handle structure H so that the one is substantially a continuation of the other. Of course, when the locking element 22 is released by pulling on the knob 23, the upper part 15 of the guiding handle structure may be folded downwardly to collapsed position as shown in Fig. 2.

Mounted on the motor 13 is a bracket 33 and pivotally connected to this bracket by a pivot pin 34 is a combined carrying handle and adjusting arm indicated generally as C. This combined carrying handle and adjusting arm has a horizontally extending portion 35 which is encircled by a rubber sleeve 36 contoured to fit the hand of the user. As best shown in Fig. 2 this horizontal portion is disposed ahead of the guiding handle structure when the latter is in stored position. The remainder of the combined carrying handle and adjusting arm C is curved as best shown in Figs. 1 and 2, the radius of curvature being equal to the distance from the pivot bolt 17 to the opening 19 in the plate or panel 18 which connects the side members 15 and 16. The rear portion 37 of this combined carrying handle and adjusting arm C which is so curved extends through the opening 19 and in cooperation with the spring member 21 and the latching dog 20 engages the same. The rear portion 37 has a plurality of recesses 38 formed therein at various points along its upper surface so that the guiding handle structure H may be moved to any position between the sleeve 36 and the free end of the arm of the rear portion 37. It will be noted that the bracket 33 is positioned adjacent the rear of the motor 13 so that the carrying handle 36 is so positioned as to balance the entire assembly when it is lifted by the carrying handle 36.

Reference to Fig. 3 will show that the M-shaped spring 21 engages the underside of the rear portion 37 of the combined carrying handle and adjusting arm C so as to urge the arm upwardly so that the latching dog 20 will engage the same in one of the recesses 38. Downward pressure upon the spring M will release the combined carrying handle and adjusting arm C and permit it to move longitudinally through the opening 20 to other adjusted positions.

Mounted on the carrying handle structure and operatively connected to the throttle and clutch of the motor 13 is a combined clutch and throttle control indicated generally as T. This combined clutch and throttle control includes, as shown, a jointed control rod having a lower portion 39 and an upper portion 40 pivotally connected as at 41. The upper portion 41 extends through the connecting plate 30 at the upper end of the guiding handle structure and a control knob 42 is secured thereto. The jointed control rod is movable longitudinally and is rotatable about its longitudinal axis. A universal joint 43 is secured to the lower end of the lower portion 39 of the jointed control arm and this universal joint is connected to a control shaft 44. Reference to Fig. 7 will disclose diagrammatically the manner of connection between the control shaft 44 and the throttle 45 and clutch 46 of the motor. Longitudinal movement of the jointed control rod by pushing or pulling upon the control knob 42 will cause the control shaft 44 to move longitudinally and thereby cause the control bracket 47 to pivot upon its pivot 48 and move the movable portion 46a of the clutch member toward or away from the fixed portion 46b as the case may be, depending upon the direction of movement of the shaft 44. Rotation of the jointed control rod about its longitudinal axis will cause the control shaft 44 to rotate about its longitudinal axis and this will cause the control bracket 49 to rotate therewith and move the throttle 45 between open and closed position.

As described briefly hereinbefore, it is a simple matter to adjust the guiding handle structure H by depressing the M-shaped spring 21. By so doing the guiding handle H may be swung to any desired angulation relative to the adapter plate 11 or the mower M.

It will be noted that the guiding handle structure H is collapsible and that when the knob 23 is pulled upwardly, the upper portion thereof may swing downwardly over the free end portion of the combined carrying handle and adjusting arm C to stored position as shown in Fig. 2. When in this position, the entire assembly A is well balanced and the user may carry the entire assembly from machine to machine by gripping the horizontal handle portion 36. It will be noted that the handle portion 36 remains horizontal regardless of the angulation of the guiding handle H so that the user always has a ready and convenient means for gripping the assembly A and moving it from machine to machine. Regardless of the position of the guiding handle H, the carrying handle 36 is always disposed horizontally.

If desired the combined carrying handle and adjusting arm C may be completely removed from the opening 19 and swung upwardly and rest upon the upper end of the panel 18 to thereby place the assembly in smaller compass taken horizontally.

It should also be noted that when the upper portion 15 of the guiding handle structure H is swung downwardly to collapsed position, the combined clutch and throttle control also folds at a point adjacent the folding point of the carrying handle H and therefore storage of the entire assembly in small compass is facilitated.

Thus it can be seen that we have provided a simple and inexpensive guiding and driving assembly having a combined carrying handle and adjusting arm which makes it always convenient for manual movement of the assembly from machine to machine. It will be appreciated, of course, that the combined carrying handle and adjusting arm will also facilitate manual movement of entire units where the machine remains attached to the adapter plate in the event such is desired.

It will, of course, be understood, that various changes may be made in the form, details, arrangement and proportions of the various parts without departing from the scope of our invention.

What is claimed is:

1. A guiding and driving assembly adapted to be mounted upon a ground traversing machine, said assembly comprising an adapter plate adapted to be secured to such a machine, an engine mounted on said adapter plate and adapted to be connected in driving relation with the machine when said plate is so secured, guiding handle structure pivotally connected with said plate and extending upwardly therefrom and being pivotable between guiding and storing positions, an arm having a forward portion disposed ahead of said guiding handle structure and being connected to said engine and extending rearwardly therefrom, said arm having an arcuately curved rearward portion extending through said guiding handle structure and engaging the same at various points along the length of said curved portion to permit adjustment of said guiding handle to various guiding positions, said first mentioned portion of said arm being horizontally disposed when said guiding handle is in storing position to provide effective handle means to facilitate manual carrying of the entire assembly.

2. In a ground traversing machine, a machine-supporting frame having ground traversing supporting elements mounted thereon, an engine mounted on said frame and connected to the machine in driving relation, guiding handle structure pivotally connected with said frame and extending upwardly therefrom and being pivotable between guiding and storing positions, an arm having a forward portion disposed ahead of said guiding handle structure and connected to said engine and extending rearwardly therefrom, said arm having an arcuately curved portion extending rearwardly from said forward portion and through said guiding handle structure and engaging the same at various points along the length of said curved portion to permit adjustment of said guiding handle to various angulated guiding positions relative to said frame, said first mentioned portion of said arm being horizontally disposed when said guiding handle is in storing position to provide effective handle means to facilitate manual carrying of the entire machine.

3. A guiding and driving unit adapted to be mounted upon a ground traversing machine said unit comprising an adapter plate adapted to be secured to such a machine, an engine mounted on said adapter plate and adapted to be connected in driving relation with the machine when said plate is so secured, guiding handle structure pivotally connected to said plate and extending upwardly therefrom and being pivotable between guiding position and substantially vertical storing position, an arm having a horizontally extending forward portion disposed ahead of said guiding handle structure and being connected to said engine and extending rearwardly therefrom, said arm having an arcuately curved portion extending rearwardly from said first mentioned portion through said guiding handle structure and engaging the same at various points along the length of said curved portion to permit adjustment of said guiding handle to various guiding positions, said curved portion of said arm having a radius of curvature equal to the distance between the point of pivot of said guiding handle structure and the point at which said arm passes through said handle structure, said first mentioned portion of said arm being substantially horizontally disposed when said guiding handle is in storing position to provide effective handle means to facilitate manual carrying of the entire unit.

4. A guiding and driving assembly adapted to be mounted upon a ground traversing machine, said assembly comprising an adapter plate adapted to be secured to such a machine, an engine mounted on said adapter plate and adapted to be connected in driving relation with the machine when said plate is so secured, guiding handle structure pivotally connected with said plate and extending upwardly therefrom and being pivotable between guiding and storing positions, and a single combined adjusting arm and carrying handle having a forward portion connected to said engine and a curved rearward portion extending rearwardly through said guiding handle structure and engaging the same at various points along the length of said curved portion to permit adjustment of said guiding handle to various guiding positions, said first mentioned portion of said arm being substantially horizontally disposed at each position of said guiding handle structure to provide effective handle means to facilitate manual carrying of the entire assembly.

5. A guiding and driving assembly adapted to be mounted upon a ground traversing machine, said assembly comprising an adapter plate adapted to be secured to such a machine, an engine mounted on said adapter plate and adapted to be connected in driving relation with the machine when said plate is so secured, guiding handle structure pivotally connected with said plate at opposite sides thereof and extending upwardly therefrom and being pivotable between guiding and storing positions, said guiding handle structure having laterally spaced upper portions and being foldable adjacent its medial portions, an arm having a forward portion disposed ahead of said guiding structure and being connected to said engine and extending rearwardly therefrom, said arm having an arcuately curved rearward portion extending through said guiding handle structure and engaging the same at various points along the length of said curved portion to permit adjustment of said guiding handle to various guiding positions and having a free end, said laterally spaced upper portions of said guiding handle being swingable over the free end of said curved portion of said arm to opposite sides of said arm when said guiding handle structure is in folded and storing positions, said first mentioned portion of said arm being substantially horizontally disposed when said guiding handle is in storing position to provide effective handle means to facilitate manual carrying of the entire assembly.

6. A guiding and driving assembly adapted to be mounted upon a ground traversing machine, said assembly comprising an adapter plate adapted to be secured to such a machine, an engine mounted on said adapter plate and adapted to be connected in driving relation with the machine when said plate is so secured and having a clutch and a throttle thereon, guiding handle structure pivotally connected with said plate and extending upwardly therefrom and being pivotable between guiding and storing positions, an arm having a forward portion disposed ahead of said guiding handle structure and being connected to said engine and extending rearwardly therefrom, said arm having an arcuately curved rearward portion extending through said guiding handle structure and engaging the same at various points along the length of said curved portion to permit adjustment of said guiding handle to various guiding positions, said first mentioned portion of said arm being substantially horizontally disposed when said guiding handle is in storing position to provide effective handle means to facilitate manual carrying of the entire assembly, and a combined clutch and throttle control operatively connected to said clutch and said throttle of said engine, said control being carried by the upper end portion of said guiding handle structure and pivotable therewith.

7. A guiding and driving assembly adapted to be mounted upon a ground traversing machine, said assembly comprising an adapter plate adapted to be secured to such a machine, and engine mounted on said adapter plate and adapted to be connected in driving relation with the machine when said plate is so secured, guiding handle structure pivotally connected with said plate at opposite sides thereof and extending upwardly therefrom and being pivotable between guiding and storing positions, said guiding handle structure having laterally spaced portions, a panel extending between said laterally spaced portions of said guiding handle structure and connecting the same, an arm having a forward portion disposed ahead of said guiding structure and being connected to said engine and extending rearwardly therefrom through an opening in said panel, said arm having an arcuately curved rearward portion extending through an opening in said panel and engaging the same at various points along the length of said curved portion to permit adjustment of said guiding handle to various guiding positions and an M-shaped spring mounted on said laterally spaced portions and extending therebetween immediately beneath said arm and engaging said arm and urging it upwardly to cause the same to positively engage said panel, said first mentioned portion of said arm being horizontally disposed at all times regardless of the position of said guiding handle to provide effective handle means to facilitate manual carrying of the entire assembly.

8. A guiding and driving assembly adapted to be mounted upon a ground traversing machine, said assembly comprising an adapter plate adapted to be secured to such a machine, a motor mounted on said adapter plate and adapted to be connected in driving relation with the machine when said plate is so secured and having a clutch and a throttle thereon, guiding handle structure pivotally connected with said plate and extending upwardly therefrom and being shiftable between various guiding positions and a storing position, an arm having a forward portion disposed ahead of said guiding handle structure and being connected to said motor and extending rearwardly therefrom, said arm having an arcuately curved rearward portion extending through said guiding handle structure and engaging the same at various points along the length of said curved portion to permit adjustment of said guiding handle to various guiding positions, said first mentioned portion of said arm being substantially horizontally disposed when said guiding handle is in storing position to provide effective handle means to facilitate manual carrying of the entire assembly, and a combined clutch and throttle control operatively connected to said clutch and said throttle of said motor, said control being carried by the upper end portion of said guiding handle structure and pivotable therewith, said guiding handle structure having laterally spaced upper portions and being foldable about its medial portions to and from a storing position, said combined clutch and throttle control being foldable adjacent the point of folding of said guiding handle structure whereby each may be folded as a unit into small compass.

9. In a ground traversing machine, a machine supporting frame having ground-traversing supporting elements mounted thereon, a motor mounted on said frame and connected to the machine in driving relation, guiding handle structure shiftably connected with said frame and extending upwardly therefrom and being shiftable between guiding and storing positions, an arm having a forward portion disposed ahead of said guiding handle structure and connected to said motor and extending rearwardly therefrom, said arm having an arcuately curved portion extending rearwardly from said forward portion and through said guiding handle structure and engaging the same at various points along the length of said curved portion to permit adjustment of said guiding handle to various angulated guiding positions relative to said frame, said first mentioned portion of said arm being substantially horizontally disposed when said guiding handle is in storing position to provide effective handle means to facilitate manual carrying of the entire machine.

10. A guiding and driving assembly adapted to be mounted upon a ground-traversing implement, said assembly comprising a motor, means for securing said motor to the machine, said motor being adapted to be connected in driving relation with the machine when said motor is so secured, guiding handle structure shiftably connected with said motor and extending upwardly therefrom and being shiftable between guiding and storing positions, an arm having a forward portion disposed ahead of said guiding handle structure and being connected to said motor and extending rearwardly therefrom, said arm having an arcuately curved rearward portion extending through said guiding handle structure and engaging the same at various points along the length of said curved portion to permit adjustment of said guiding handle to various guiding positions, said first mentioned portion of said arm being substantially horizontally disposed when said guiding handle is in storing position to provide effective handle means to facilitate manual carrying of the entire assembly.

References Cited in the file of this patent

UNITED STATES PATENTS

| 727,869 | White | May 12, 1903 |
| 2,429,378 | Stuebner | Oct. 21, 1947 |
| 2,695,071 | Hupp | Nov. 23, 1954 |

FOREIGN PATENTS

| 711,039 | France | June 16, 1931 |

U. S. DEPARTMENT OF COMMERCE
PATENT OFFICE

CERTIFICATE OF CORRECTION

Patent No. 2,821,258                                January 28, 1958

Donald O. Benson et al.

It is hereby certified that error appears in the printed specification of the above numbered patent requiring correction and that the said Letters Patent should read as corrected below.

Column 6, line 59, for "and engine" read -- an engine --.

Signed and sealed this 25th day of March 1958.

(SEAL)
Attest:

KARL H. AXLINE
Attesting Officer

ROBERT C. WATSON
Commissioner of Patents